United States Patent [19]

Leuenberger

[11] Patent Number: 4,656,056
[45] Date of Patent: Apr. 7, 1987

[54] PROCESS OF TREATING A PARTICULATE MATERIAL AND APPARATUS FOR IMPLEMENTING THE PROCESS

[75] Inventor: Hans Leuenberger, Pfeffingen, Switzerland

[73] Assignee: Glatt Maschinen-und Apparatebau AG, Pratteln, Switzerland

[21] Appl. No.: 735,265

[22] Filed: May 17, 1985

[30] Foreign Application Priority Data

May 19, 1984 [CH] Switzerland .................. 2483/84

[51] Int. Cl.⁴ .................................................. B05D 1/00
[52] U.S. Cl. ...................................... 427/213; 118/303; 427/212; 427/242
[58] Field of Search ............ 427/213, 212, 242, 255.5, 427/222; 118/70, 303, 716

[56] References Cited

U.S. PATENT DOCUMENTS

| | | | |
|---|---|---|---|
| 2,702,523 | 2/1955 | Prestwood et al. ............ | 118/716 |
| 2,953,359 | 9/1960 | Mau ................................ | 118/303 |
| 3,187,715 | 6/1965 | Wellard ........................... | 118/716 X |
| 3,196,032 | 7/1965 | Seymour ......................... | 427/222 X |
| 3,260,235 | 7/1966 | Witz ................................ | 118/716 |
| 3,394,468 | 7/1968 | Zeller .............................. | 34/57 |
| 3,395,674 | 8/1968 | Burham et al. ................. | 118/716 |
| 3,594,215 | 7/1971 | Wakefield ....................... | 427/213 |
| 3,818,605 | 6/1974 | Glatt ................................ | 34/57 |
| 3,908,045 | 9/1975 | Alterman et al. .............. | 427/213 |
| 4,144,308 | 3/1979 | Johnson ........................... | 118/716 X |
| 4,217,851 | 8/1980 | Biehl et al. ...................... | 427/213 X |
| 4,318,771 | 3/1982 | Grab et al. ...................... | 159/16 |
| 4,476,804 | 10/1984 | Glatt et al. ..................... | 118/19 |

FOREIGN PATENT DOCUMENTS

| | | | |
|---|---|---|---|
| 931441 | 8/1973 | Canada ............................ | 427/255.5 |
| 2539434 | 3/1977 | Fed. Rep. of Germany ... | 427/255.5 |
| 3204466 | 10/1982 | Fed. Rep. of Germany . | |

Primary Examiner—Shrive P. Beck
Attorney, Agent, or Firm—Fleit, Jacobson, Cohn & Price

[57] ABSTRACT

A particulate material containing particles to be agglomerated and/or provided with a coating is introduced in batches into a space bounded by a container, in which a gas, in particular air, is passed through the particles. The particles are set in motion, for instance by the gas, such as in whirling motion, to form a whirling layer. The particles are wetted by means of a mixture consisting of a gas and the vapor of a wetting agent. This mixture is introduced into the space containing the particles, and cold gas and a mixture of warm gas and wetting agent are supplied for example, alternately. In this manner, the particles may be wetted uniformly and relatively fast, and held at a relatively low temperature. This is of considerable advantage when processing thermolabile materials.

24 Claims, 4 Drawing Figures

PROCESS OF TREATING A PARTICULATE MATERIAL AND APPARATUS FOR IMPLEMENTING THE PROCESS

BACKGROUND OF THE INVENTION

1. Field of the Invention

The present invention relates to a process in which particles of a particulate material are wetted to be agglomerated or coated. Gas is passed through the particles and the latter are subjected to motion by the gas and/or mechanical means. The particles are wetted by adding a wetting agent to the gas.

2. Description of the Prior Art

In known processes of this kind the particles are introduced into a container together with warm air to generate a whirling layer. A liquid is sprayed into the fluidized material to agglomerate the particles in said particulate material or to coat them, as required. In these processes the particles are heated approximately to the temperature of the warm air, which may have disadvantages when thermolabile substances are being processed. Proteins, for instance, can be denatured. Furthermore, particularly if the batches are large, it is not possible, or only with considerable expenditure of time, to uniformly wet all of the surfaces of all of the particles by means of the sprayed liquid, as is required for forming homogeneous agglomerates or coatings.

It is known from the International Disclosure Publication WO 82/03972, as well as the corresponding U.S. Pat. No. 4,543,906, and the U.S. Pat. No. 4,476,804 to pass warm air through a bed of particles disposed within a rotating drum and to spray a liquid material onto the particles. The problems that arise in this process are similar to those mentioned before in conjunction with the agglomeration or coating in a whirling layer.

An agglomeration process is known from the German Disclosure Publication 32 04 466, in which jets of overheated steam are introduced by means of steam nozzles into a whirling layer consisting of warm air and a particulate material. In this process, the steam jets are each surrounded by a jet of warm air introduced coaxially thereto. The Disclosure Publication specifies the various steam and air jets to first mix with each other, to make the steam cool off. Then the steam should condense on the particles.

However, in actual reality the process cannot very well proceed in this manner. Since the exit openings of the steam nozzles are located in the region of the whirling bed, the possibility exists, that particles may come in contact with the hot steam, before the steam had a change to cool off, so that if the particles consist of a thermolabile material, they may suffer damage. Since the steam is intended to cool off by becoming mixed with warm air, it seems rather difficult to dose the steam supply in a way to make the steam condense to a large extent and form a mist during the time it gets mixed with the warm air. The formation of a mist contributes to the phenomenon, that a lot of water is carried away with the air sucked upwardly, so that the filters disposed above the whirling bed may become wet. More important is, however, that the particles present in the whirling bed will take on approximately the temperature of the warm air relatively fast. The particles are in addition heated by the condensing heat of the vapor. At that moment, however, the particles are at most slightly less cool than the part of the supplied steam cooled off to the temperature of the warm air. Accordingly, the quantities of steam condensing on the particles are negligible. Furtheron, the particulate materials are also heated in this process so that materials sensitive to high temperatures may also be damaged.

SUMMARY OF THE INVENTION

The present invention has as one of its objects the provision of a process of treating particulate material, such as agglomerating and/or coating the particles, in such a way that the disadvantages of the known processes are eliminated to the largest possible extent.

Another object is to provide for uniformly wetting the particles on their entire surface, at least transiently and with reduced expenditure of time.

Another object is to provide for the possibility to keep the extent of heating the particles low, if they are made of thermolabile materials.

Another object is to provide for the possibility to have a rather large part of the wetting agent supplied reach the particles.

Another object is the provision of an apparatus for implementing the process.

These and other objects are attained in accordance with one aspect of the invention by providing a process in which the particles are subjected to motion in a space, gas is passed through the particles and the vapor of a wetting agent destined to wet the particles is added to the gas at least during a certain time interval, so that at least one zone of the space containing the particles will contain a mixture of gas and wetting agent vapor, wherein the particles are cooled below the dew point temperature which the mixture of gas and wetting agent vapor has at least at the time before its contact with the particles and before it wets the particles by condensing wetting agent vapor.

The apparatus for implementing the process namely for wetting a particulate material comprises a container bounding a space destined to receive a particulate material, furthermore means for imparting motion to the particles of the particulate material and to introduce gas and a wetting agent into said space, to form a mixture of a gas and a wetting agent vapor, wherein cooling means are provided for cooling the particles.

The gas used may be air or another gas, such as an inert gas, for example nitrogen. The wetting agent preferably consists of water, it may however consist of an organic solvent, such as alcohol or isopropanol. A mixture of water and organic solvent may be used too.

The process and the apparatus may be used for instance for the purpose of agglomerating solid particles originally present in a particulate material to larger particles. The particles involved may all be of the same material, or they may be particles of different materials. The particles may be agglomerated by wetting the particle surfaces and make the particles adhere to each other. However, it is possible to use a particulate material comprising "useful" particles as well as adhesive particles. The latter would make the useful particles adhere to each other subsequent to wetting. Or, an adhesive may be sprayed in addition to wetting, onto the particles, to make them agglomerate.

The process and the apparatus may also be used to cover particles forming nuclei with a layer made of a different material. In this case, the wetting agent may be a solvent of the coating material to be applied. This, for example could be sprayed in the form of a solution onto the particles. As a matter of fact, preceding or simultaneous wetting of the particles to be coated by condensing the solvent in vaporized state may favor the formation of uniform coatings. The same applies to a case in which the material intended for the coating is sprayed onto the particulate material at least in part in the form of fine particles suspended in a carrier liquid or a carrier gas. In this case too, it may be of advantage, to wet the particles to be coated with a wetting agent. When using at least one soluble and/or suspended coating material, the wetting agent may be apllied prior to or at the same time with this coating material. In this case it may be of considerable advantage to apply the wetting agent alternately with the coating material.

However, the process may be used for both, the agglomeration and the coating of particles with at least one layer. In such a case it is possible to agglomerate at first smaller particles into larger nuclei, for example by motion and wetting. Then these nuclei may be coated with at least one layer of a coating material.

The agglomeration and/or the coating of particles may be used for instance for the manufacture of medicinal drug particles for use by humans and perhaps by animals. In such a case the manufactured particles may be so called solid administered drugs or intermediate products used for the manufacture of the former. The process and the apparatus according to the invention may be used for example for agglomerating particles containing a pharmaceutical "active substance" and/or to provide particles containing a pharmaceutical effective substance with a sugar-free or a sugar containing coating. Furthermore, spherical particles consisting of sugar may be coated with a pharmaceutical active substance to form so-called pellets, which then may be put into capsules. The process of the invention may, however, serve for coating capsules too.

The process and the apparatus of the invention may also be used for manufacturing drug particles destined to be dissolved into solutions for forming infusions. The process and the apparatus of the invention may also be used in the manufacture of so-called instant products such as soluble coffee, tea, fruit components and other foods, furthermore in the manufacture of fertilizers and plant protecting agents, and for the agglomeration and/or coating of seeds with nutrients or fertilizing and plant protecting agents.

The invention, and its objects and advantages, will become more apparent in the detailed description of the preferred embodiments subsequently presented.

BRIEF DESCRIPTION OF THE DRAWINGS

In the detailed description of the preferred embodiments of the invention hereinafter presented, reference is made to the accompanying drawings, in which.

DETAILED DESCRIPTION OF THE PREFERRED EMBODIMENTS

Figure 1:
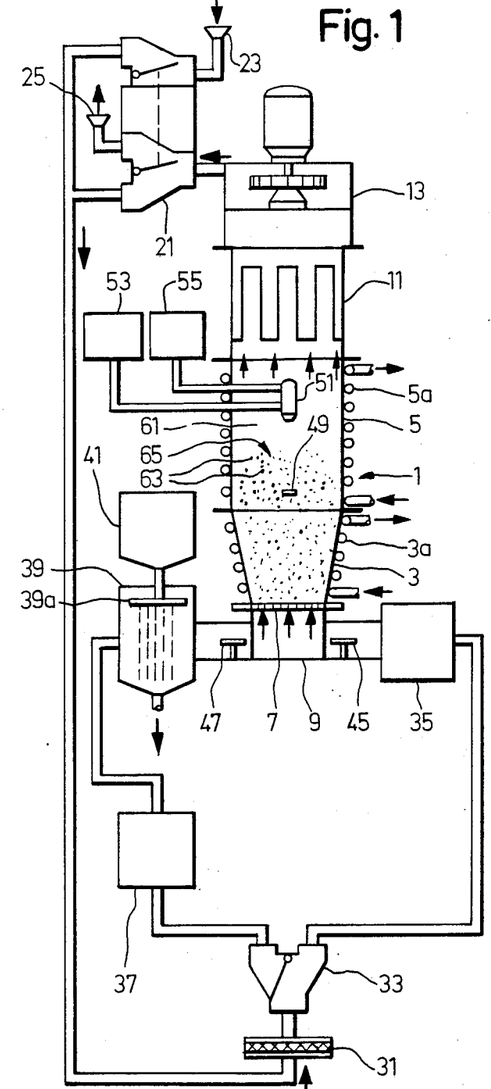
FIG. 1 shows in schematic form a vertical section through an apparatus for generating a whirling layer by intermittently introducing cool air and a warmer mixture of air and water vapor.

The apparatus shown in FIG. 1 displays a container 1 fixedly held on a support, not shown in the drawing, and comprising a conical lower part 3 tapering downwardly and a cylindrical upper part 5. The lower part 3 is provided at its lower end with a gas permeable, sieve-like bottom plate 7; a gas distributor 9 is disposed on the underside of the bottom plate 7 and is provided with an opening facing the bottom plate 7 and being connected therewith. A filter 11 with cylindrical housing is fixedly mounted at the upper end of the upper part 5. A suction device 13 disposed at the upper end of the filter 11 comprises a housing, a blower and a motor for driving the blower.

The walls of the lower and upper parts are each preferably provided with a heating device 3a and 5a, respectively, for example in the form of a heating coil. In addition to the heating devices 3a, 5a, or instead of these, the said walls may each be provided with heat insulation. Also, the lower part 3, the upper part 5, the bottom plate 7, the gas distributor 9, the filter 11 and the suction device 13 are detachably connected with each other and, for example, as indicated, provided with flanges protruding outwardly and connected with each other by screws or any other means of connection.

A conduit connects the exit of the suction device 13 with the entry of a filter 31. The conduit comprises a valve 21, connected for example with an air inlet 23 for admitting air from the surrounding atmosphere, and an air outlet 25 arranged to open into the surrounding atmosphere. The valve 21 comprises at least one shut-off and throttling element, for example two flaps which may be swivelled together. The valve 21 is adapted to distribute the air it receives from the suction device 13 either to the air outlet 25 or to the filter 31, as required, or between the air outlet 25 and the filter 31 in any desired proportion, whereby air may get from the air inlet 23 to the entry of the filter 31 in dependence of the flap setting. It is a matter of course that the valve 21 could be replaced by two separate, independently operable valves.

A valve 33 comprises an entry connected with the exit of the filter 31, and furthermore, two exits and an adjustable shutting- throttling- and diverting element, in the form of a swivelling flap. The design of the valve 33 permits its entry to be selectively connected pneumatically, with only either one or the other of its two exits. The valve is furthermore adapted to permit the air it receives through its inlet to be distributed in any adjustable proportions between its two exits. The valve 33 could also be replaced by two separate valves having their entries connected with each other and with the exit of the filter 31.

One of the exits of the valve 33 is pneumatically connected with the gas distributor 9 by way of a cooling device 35 and its other exit by way of a heating device 37 and a device 39 adapted to produce a mixture of gas and water vapor. The cooling device 35 serves at the same time as a drying device, adapted to at least partially dry the air passing through it. The cooling device 35 may comprise a cooling coil adapted to have a cooling fluid or another cooling medium passed through it.

The drying of the air passing through the cooling device 35 may be accomplished for example in dependence of the cooling temperature so, that the vapor contained in the supplied air is removed from the air by condensation or by freezing it out. The heating device 37 may be designed for example as a heat exchanger. The device 39 for producing a mixture of gas and water vapor comprises for example a chamber and a sprinkler-like liquid distributor 39a. The latter is connected with a feeding device 41, comprising for example a water reservoir and a device for heating the water to be fed to the water distributor, approximately to the temperature of the air supplied by the heating device 39. During operation of the device 39 warm air flows through its chamber, and the water distributor 39a produces water drops trickling through the stream of air, so that the air becomes moist. The excess water collecting at the bottom of the chamber of the device 39 is carried away continuously or intermittently from the chamber and fed back through the reservoir of the feeding device 41; it also may be evacuated through the sewer system.

The passages which connect the cooling device 35 and the device 39 with the gas distributor 9 comprise each a temperature sensor 45 and 47, respectively. A single common temperature sensor may be sufficient, which would then be disposed for instance in the gas distributor 9. It may also be possible to have in addition at least one sensor, which would measure the water vapor content of the air flowing from the device 39 to the bottom plate 7, and perhaps the vapor content of the air supplied by the device 35. Furthermore, there is at least one additional temperature sensor 49 provided within the container 1 to measure the temperature of the particles contained in the whirling layer, and perhaps a sensor for measuring the absolute and/or relative humidity of the air. The upper part 5 of the container 1 also comprises at least one spraying member 51 provided with at least one downwardly directed nozzle. In this case the spraying member 51 may be fixedly and detachably mounted in a way to be unmounted in simple manner if not used. The spraying member 51 is connected or connectable by way of conduits to a compressed gas supply device 53 comprising for example an air compressor and a compressed air reservoir, and to a feeding device 55 destined to supply the spraying material.

An electronic control device, not shown in the drawing, may also be provided, its function being that of controlling the suction device 13, the valves 25 and 33, the devices 35, 37, 39, 53, 55 or at least some of these. Such control may be accomplished manually by the actuation of switches and/or may take place at least partially in automatic fashion. Automatic control may be realized in accordance with a program based on a fixedly set time sequence and/or based on measurements. In this case, temperatures measured by means of the temperature sensors 45, 47 may be used, to control and regulate the cooling device 35 and the heating device 37. Furthermore, the duration of time intervals, in which cold and warm air is supplied in a manner yet to be described in detail may be set based on temperature measurements made by means of the temperature sensor 49.

It the apparatus is to be used for treating and processing a particulate material, a batch of this material is introduced into the lower part 3 of the container 1, this lower part 3 being transiently separated for this purpose from the remaining part of the container. If the lower part 3 is connected with the remaining part of the container, the latter bounds, or more accurately, its lower and upper parts enclose a space 61 tightly closed off from the surroundings. If during operation the suction device sucks air upwardly through the gas permeable bottom plate 7, the particles 63 of the particulate material contained in the container 1 will be set in whirling motion and form a whirling layer 65. FIG. 1 and the other figures yet to be described show by means of arrows some additional direction of flow of fluid and air.

A case will now be considered in which the particles originally contained in the particulate material are to be agglomerated to larger particles. In this case, the originally provided particles may have for example such a structure, that after wetting their surfaces with water they stick to each other and—subsequent to the drying process—they form aggregates, i.e., larger particles.

It will now be assumed, that the particles or at least one part thereof consist of a thermolabile material, which in the course of its being processed should preferably not be heated above a certain limit temperature, which for example may be not less than 20° C., or not less than 30° C. and not more than 60° C., or even not more than 40° C.

The particulate material which constitutes the raw material for the agglomeration may be for example a mixture consisting of particles of an "active substance" such as potassium bromide or vitamin C, and adhesive particles consisting of sucrose. Or, one may have to process for example a particulate material containing vitamin C as the effective substances, lactose particles as carrier material and particles of polyvinyl pyrrolide as bounding agent. The particulate materials could furtheron comprise proteins, peptids, lipids, such as phospholipids, or lipoproteins as active substances. Such active substances which can be very sensitive to elevated temperatures and/or oxidation effects can consist of synthetic substances or can be of natural origin and can in the latter case for instance be formed by enzymes or by components of microorganisms.

The process of agglomeration shall now be explained more in detail. For this purpose it will be assumed, that the flap of the valve 33 is initially in the extreme position shown in FIG. 1. Accordingly, air cooled in the cooling device 35 will be first introduced into the space 61, to form the whirling layer 65. This cold air flows through the entire range of heights of the space 61 occupied by the particles 63, specifically through the whirling layer, and thus cools the particles 63. Upon entering the space 61 the cold air has a maximum temperature of +20° C., or preferably at most +10° C., and a minimum temperature of preferably not less than −10° C., or for example lying between +5° C. and −5° C. The temperature of the cold air is set for practical reasons just exactly so low, as to cool down the particles 63 in the whirling layer to a rather low temperature, while avoiding any freezing of the water deposited subsequently onto them or already present on them. Inasmuch as the freezing temperature of the water deposited on the particles may be lowered, more or less in dependence of the specific particle material, there follows, that the optimum setting for the temperature of the supplied cold air depends among others on the material of the particles and also on the pressure in the space 61. The cold air supplied by the cooling device 35 should be free of water droplets, i.e., it should be free of mist (fog) and should contain at most exactly saturated or preferably unsaturated vapor. The relative humidity of the cold air may lie for example between 60 and 90%.

After a certain period of time has elapsed, sufficient to cool the particles 63 down at least to approximately the temperature of the cold air, the flap of the valve 33 is moved to its other extreme position, with the effect, that air will now be sucked into the space 61 by way of the heating device 37 and the device 39 producing a mixture of gas and water vapor. The mixture of warm air and water vapor supplied by the device 39 and flowing into the space 61 is at least approximately homogeneous, i.e., the concentration of the water vapor while flowing through the gas permeable bottom plate 7 is pretty much uniform over the entire flow cross section. Furthermore, the air and the water vapor in the mixture should have at least approximately and preferably exactly the same temperature. This temperature of the mixture of warm air and water vapor is naturally greater than the temperature of the previously introduced cold air and should be at most equal to the above-mentioned limit temperature admissable for the particulate material to be agglomerated and should, thus, not be higher than approximately 60° C. and may be not higher than 40° C., and not lower than 20° C. or 25° C., or for example not lower than 30° C. Moreover, the temperature of the mixture of warm air and water vapor should be not less than by 10°, or if needed not less than by 15°, and preferably not less than by 20° higher than the temperature of the cold air or the temperature to which the particles are cooled down during the cooling process. The mixture of warm air and water vapor formed by wetting the warm air is free of mist (fog), so that the water vapor present therein is at most saturated, but preferably unsaturated. The proportion of water vapor should be high enough to guarantee, that the dew point temperature of the mixture of warm air and water vapor, or more accurately of the water vapor contained in the mixture is greater—at least upon entry of the mixture into the space 61—than the temperature to which the particles 63 were cooled down before. The relative humidity of the warm air of the mixture should preferably amount to not less than 60°, or for example not less than or approximately 80%, or even not less than or approximately 90%, and may have a similar value as that of the cold air delivered by the cooling device 35. In contrast thereto, the vapor density of the mixture of warm air and water vapor, i.e., the absolute humidity of the warm air, is considerably higher than that of the cold air.

When the mixture of warm air and water vapor comes in contact with the particles 63 in the whirling layer 65, the water vapor contained in it will condense on the outer surfaces of the particles 63, with the effect, that these particle surfaces will be wetted uniformly. The wetted particles can then agglomerate to larger particles. While the mixture of warm air and water vapor flows through the entire height of the space 61 occupied by the particles 63, i.e., through the whirling layer 65, from the bottom to the top, its water vapor content falls off due to the loss of water to the particles. Accordingly, the dew point temperature of the mixture, or more accurately of the water vapor contained therein, drops during the flow through the whirling layer. Furthermore, a heat exchange takes place between the previously cooled particles 63 and the mixture of warm air and water vapor, whereby heat is set free by the condensation of vapor. Thus, the particles 63 are heated up by the mixture of warm air and water vapor. Inasmuch as a thorough wetting of the particles is only possible when their temperature lies below the dew point temperature of the warm air, the mixture of warm air and water vapor should be supplied for a duration of preferably not more than is required for the particle temperature to rise to the dew point temperature of the newly entering mixture, i.e., water vapor. If it is not possible to sufficiently wet the particles during a time interval measured in the above way, said particles may be cooled off again by supplying cold air, and then wetted again by supplying mixture of warm air and water vapor. In this way it is possible to alternately supply cold air and mixture of warm air and water vapor, for a time interval long enough to sufficiently wet and agglomerate the particles.

In case the container is alternately supplied with cold air of low water vapor density and with the mixture of warm air and water vapor having high water vapor density, the cooling device 35 is needed only in those time intervals, in which the supply of cold air takes place. Conversely, the heating device 37 and the device 39 are needed only during the time intervals in which warm air is supplied. Therefore, these devices may be operated continuously during the entire operation, or alternately by switching them on and off.

If the intervals during which warm air is supplied are set in the aforementioned way, a large part of the water vapor contained in the warm air becomes used up in wetting the particles, with the advantage, that only small quantities of water vapor will be transported in the air to the filter 11 and discharged through the same. The walls or casings of the lower part 3 and the upper part 5 are heated by means of the heating devices 3a and 5a, respectively, to a temperature at least equal to the dew point temperature of the mixture of warm air and water vapor at the entry thereof into the space 61, with the result, that no water vapor condenses at the said walls. The temperature of the walls of the lower part 3 and the upper part 5 is, however, preferably not more than, or for example approximately equal to the temperature of the mixture of warm air and water vapor as the same enters the space 61, with the result, that the mixture of warm air and water vapor and the particles coming in contact with the walls do not get heated by the walls above a prescribed limit temperature.

The fact, that a very good heat exchange takes place within the whirling layer 65 between the particles and the air, i.e., between the mixture of air and vapor, makes the agglomeration process proceed relatively fast. As soon as the originally provided particles are agglomerated to the desired size, the resulting agglomerates are dried in the whirling layer. This can be accomplished for example by means of warm air supplied by the heating device 37. It is self-understood, that the warm air will not get moistened this time. If the drying takes place by means of warm air heated in the heating device 37, the device 39 is put out of operation and bridged over by way of a bypass not shown in the drawing. The drying may be accomplished however, by means of air having the temperature of the surroundings or even by means of air cooled by the cooling device 35. The air used for drying may possibly be not only cooled but also dried by the cooling device 35 before it enters the container 1 and/or it may be dried by an additional drying device not shown in the drawing. The agglomerates are removed from the container 1 as soon as they are dry.

If the spraying member 51 is not required for accomplishing the agglomeration, it may be unmounted or left out altogether. However, in certain cases, when agglomeration is required, it may be necessary or useful to spray onto the particles of the whirling layer 65, at least during a certain time interval, a spraying material, such as a bonding agent, by way of a spraying member. The spraying member 51 makes it above all possible, to use the apparatus not only for agglomeration but also for coating particles with coatings. The spraying material may then preferably consist for example of a water containing liquid, in which the material destined to form the coating is dissolved and/or suspended. In certain cases it may be possible to spray onto the particulate material in the whirling layer 65, by way of the spraying member 51, a liquid-free powder as spraying material. Particularly if the particles 63 in the whirling layer 65 are at least partially water soluble and/or if the material sprayed by means of the spraying member contains an aqueous solution or a suspension or a water soluble material, then a wetting of the particles 63 in the whirling layer 65 by condensing water vapor according to the process described for agglomeration, may make an important contribution toward uniformly distributing the spraying material sprayed by the spraying member 51 on the surface of the particles to be agglomerated or coated. The wetting by vapor condensation may then be at least partially accomplished for example before spraying the spraying material and/or simultaneously with the spraying thereof. Thus, e.g., the particles may be first cooled by means of cold air and then wetted with moist warm air, with the possibility of having cooling and wetting time intervals succeed each other alternately. The spraying material may then be sprayed for example during each interval, during which moist warm air is also supplied. In such cases it may be indicated to spray the spraying material during part of these intervals only; thus for example it may be useful to supply moist air during the initial periods of the intervals without spraying any spraying material. If, when coating particles with a coating, a material is sprayed onto said particles over a long period of time or over several time intervals, it may be necessary in certain cases to only wet the particles by vapor condensation before the material is sprayed and/or during the initial phases of the spraying process only.

Figure 2:
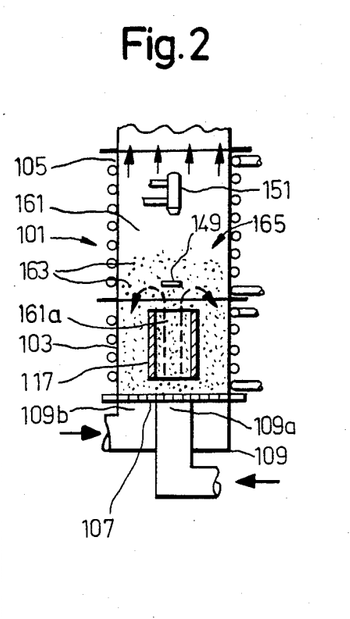
FIG. 2 shows in schematic form a vertical section through a portion of the apparatus for generating a whirling layer by simultaneously feeding the cool air and the warmer mixture of air and water vapor.

FIG. 2 shows one portion of an apparatus including a container 101 comprising a lower part 103 and an upper part 105. The lower part is provided below with a gas permeable bottom plate 107, on the underside of which is disposed a gas distributor 109. The lower part 103 differs from the lower part shown in FIG. 1 in that its outer wall is cylindrical rather than conical. The lower part 103 furthermore coaxially houses a sleeve-shaped hollow cylindrical flow guide member 117 open at its both ends. This member 117 is referred to in the technical field as Wurster sleeve or cylinder and is fastened to the wall of the lower part 103, or else to the bottom plate 107 by means of fastening members, such as thin rods, not shown in the drawing.

The shell of the flow guide member 117 is preferably provided with a heating device, to heat its outer surface approximately to the temperature of the mixture of warm air and water vapor to be supplied. For the rest, the shell of the member 117 may consist wholly or in part of a heat insulating material, so that the inner surface of the shell is thermally insulated from its outer surface. The shell may be provided with a cooling device too, to cool its inner surface to the temperature of the cold air to be supplied. The member 117 is dimensioned and disposed in such a way, that a ring-shaped interspace is provided between its outer surface and the inner surface of the wall of the lower part 103, another interspace being provided between its lower end and the gas permeable bottom plate 107. Not considering that the said interspaces may be penetrated by the aforementioned fastening elements of the member 117 and the connecting conduits of the heating and cooling devices which may be provided inside or outside the shell of the member 117, the said interspaces are free (empty), so that the flow may pass through and around the member 117 in a manner yet to be described. The gas distributor 109 differs from the gas distributor 9 in that it defines two ports 109a and 109b pneumatically separated from each other and arranged to face the gas permeable bottom plate 107 and be connected thereto. The port 109a is arranged to face the inner space of the member 117 and extends in horizontal projection approximately over the same surface as that of the hollow space inside the member 117. The port 109b surrounds the port 109a and extends over the area of the bottom plate 107 embracing the port 109a. The port 109a is pneumatically connected to a cooling device not shown in the drawing, which corresponds to the cooling device 35, whereas the port 109b is pneumatically connected to a device corresponding to the device 39.

The upper part 105 of the container 101 is constructed the same way as the upper part 5 of the container 1 and it may comprise—in analogy to the upper part 5—at least one temperature sensor 149 and at least one spraying member 151. A filter and a suction device, both not shown in the drawing, are disposed above the suction device. This filter and the suction device, as well as the remaining parts of the apparatus, may be identical in design with the apparatus of FIG. 1, in so far as no statements to the contrary have been made before. An apparatus may also be provided, in which two sets may be mounted selectively: the upper part 3, the bottom plate 7 and the gas distributor 9, or the upper part 103, the bottom plate 107 and the gas distributor 109.

The apparatus, part of which is shown in FIG. 2, may also be used for producing agglomerates and/or for coating particles with coatings. In this case too, a whirling layer 165 is formed of the particles 163 in the particulate material to be treated, in the space 161 bounded by the container 101. The hollow space of the member 117 constitutes in this case a partial zone 161a of the space 161. In the apparatus shown in FIG. 2 in its specific phase of operation, in which the particles 163 are to be wetted by condensing water vapor thereon, cold air is introduced into the space 161 through the gas distributor port 109a and at the same time a mixture of warm air and water vapor is introduced by way of the gas distributor port 109b. By an appropriate setting of the flap of the valve corresponding to the valve 33, the air quantities supplied are adjusted to fit to the horizontal cross-sectional areas of the inner space of the member 117 and of the interspace provided between the latter and the wall of the lower part. This adjustment of the air quantities supplied is accomplished so that in general, and to the greatest part, the particles 163 in the whirling bed 165 are transported within the member 117 in an upward direction in the manner indicated by the dashed arrows, said particles 163 being arranged to move downwardly along the outside of the member 117 and to arrive through the space between the lower edge of the member 117 and the bottom plate 107 back into the inner space of the member 117.

The interspace between the bottom plate 107 and the lower edge of the member 117 is so dimensioned and the gas distributor is so designed, as to enable the particles 163 to enter the member 117 from below, without risking any intermixing of larger quantities of cold and warm air. Thus, the sleeve-shaped flow guide member 117 separates to a certain extent the flow of cold and warm air from each other, at least in the height zone it is disposed in. In order to realize such useful and favourable conditions of flow, the port 109a could be designed nozzle-like for example, and or the apertures of the sieve-like bottom plate 107 could be given widths of different sizes in the two regions facing the two ports 109a and 109b; and/or the bottom plate 107 could be provided with additional flow guide members to separate the cold air flow from the warm air flow.

The particles 163 transported within the flow guide member 117 in an upward direction are cooled down during the time interval required for running through or climbing through the partial region 161a of the space 161, to at least approximately the temperature of the cold air, so that their temperature lies below the dew point temperature of the mixture of warm air and water vapor supplied through the gas distributor port 109b. As soon as the particles cooled in this way exit through the upper part of the member 117 and are made to move downwardly along the outside thereof, they stop being cooled and instead they come in contact with the mixture of warm air and water vapor, and become wetted by the condensation of the water vapor contained in the mixture. Even though in this phase of the operation the space 161 bounded by the container 105 receives cold air poor in water vapor and at the same time warm air rich in water vapor, the particles will be, in general, cooled with cold air and wetted with moist warm air, alternately. Thus, the wetting takes place according to a principle similar to that of the operation of the apparatus of FIG. 1, wherein both the air temperatures and the air humidity may be predetermined, in a way similar to that described in conjunction with the operation of the apparatus of FIG. 1.

By heating the wall of the container 101 and the outer surface of the member 117, which should preferably take place, it is possible to avoid any condensation of vapor on the inner surface of the wall and the outer surface of the member 117.

Inasmuch as the particles on the outside of the member 117 are made to move in downward direction while at the same time a large part of the water vapor mixed with the warm air is removed, the humidity of the warm air is lowered during the upward flow. Therefore, at the time the warm air gets intermixed with the cold air above the sleeve, to a greater or lesser extent, the warm air will be relatively dry already.

As soon as the particles originally introduced into the container 101 have been agglomerated or provided with a coating, as intended, they are dried in the whirling layer 165. When drying is aimed at, cold air may be introduced into the container through the port 109a and warm air through the port 109b; however, as is self-evident, the warm air will not get moistened in this case. However, in addition to the conduits and the valves 33 shown in FIG. 1, other conduits and valves or heating, cooling and drying devices may be provided; in this way it is made possible to conduct air of the same temperature through both ports 109a and 109b, this temperature to be conveniently equal to the temperature of the surroundings, or greater or smaller than the same.

Figure 3:
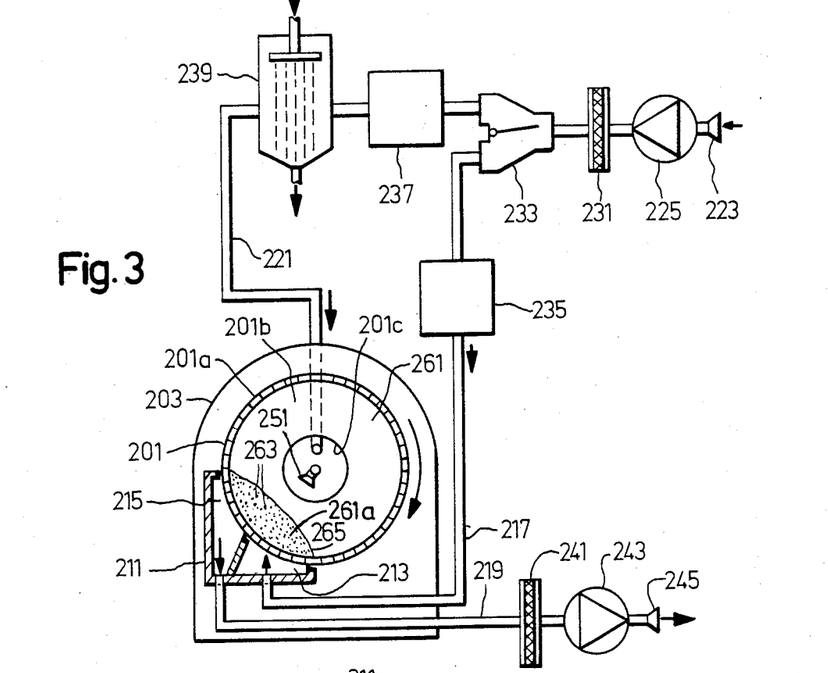
FIG. 3 shows in schematic form a cross-section through the apparatus, comprising a rotatable container provided with a perforated wall and with means for passing the cool air and the warmer mixture of air and water vapor through a particle bed provided in the container.

The apparatus shown in FIG. 3 and destined to coat particles with a coating, and perhaps to agglomerate particles, comprises a drum-like container 201 disposed within the inside space of a housing 203 closed gastight with respect to the surroundings. The container 201 is supported on a frame connected with the housing, by supporting means, not shown, said container 201 being supported rotatably around an axis disposed at an angle with respect to the vertical, more specifically around a horizontal axis of rotation, and is rotatable by means of a drying device not shown in the drawing. The container 201 comprises a wall in the shape of a cylindrical shell 201a at least partially perforated and connected at each of its ends with a conical wall part 201b. The central regions of the container faces are each provided with an opening 201c. A gas transmitting shoe 211 is adjustably connected with the frame and the housing 203. The gas transmitting shoe 211 has a box-like shape and is open at its side facing the axis of roation of the drum, the inner space of the gas tranmitting shoe being subdivided into two chambers 213 and 215 by a separating wall disposed parallel to the rotational axis of the container 201. The edges of the gas transmitting shoe portions which bound the two chambers 213, 215 and face the container 201 are provided with seals which, in the working position of the gas transmitting shoe 211 shown in FIG. 3, lie tight against the outer surface of the cylindrical shell 201a of the container 201. Thus, the chambers 213, 215 form two ports facing the shell 201a, which together extend approximately over one of the lower quadrants of the container 201. The two chambers are connected with the schematically shown conduits 217, 219, which also comprise couplings not shown in the drawing. Another schematically shown conduit 221 opens into the opening 201c provided in the front end of the container 201. In addition, a spraying member 251 with at least one nozzle is provided inside the container 201. The parts of the apparatus described so far and shown in FIG. 3 may be built for example identical or similar to the apparatus described in the U.S. Pat. No. 4,476,804.

Furthermore, reference is made to the International Disclosure Publication WO 82/03972, as well as the corresponding U.S. Pat. No. 4,543,906, which discloses constructional details of a partially similar apparatus.

A device for supplying the mixture of gas and water vapor comprises an air inlet 233 connected with the inlet of a blower 225. The exit of the blower is connected by way of a filter 231 with the inlet of a valve 233. This valve comprises two exits, one of which is connected by way of a cooling device 235 with a conduit 217 and thus with the chamber 213 of the gas transmitting shoe 211. The other exit of the valve 233 is connected by way of a heating device 237 and a device for generating the mixture of gas and water vapor with the conduit 221, and thus with the space 261 bounded by the container 201, i.e., it is connected with the inner space of the container. The valve 233 and the devices 235, 237, 239 may be similar in design to the valve 33 and the device 35, 37, 39 of the apparatus sown in FIG. 1. The conduit 219 connects the chamber 215 by way of a filter 241 with the inlet of a suction device 243, the exit of which is connected to an air outlet 245. In addition there may be provided temperature sensors and an electronic control device for controlling the operating sequence.

The particulate material containing the particles 263 to be coated is introduced in batches into the space 261 bounded by the container. If the container 201 is rotated in the direction indicated by the arrow, the particles 263 therein form a particle bed 265 in the specific quadrant, in which the gas transmission shoe 211 is located. The material destined to supply particle coatings is sprayed by the spraying member against the particle bed. In order to wet the particles before and/or at least during a part of the spraying process, cold air is supplied through the conduit 217 and at the same time the mixture of warm air and water vapor is supplied through the conduit 221; air and water vapor are removed by suction though the conduit 219. Cold air flows now from the chamber 213 across the perforated shell 201a into the lower zone of the particle bed 265 and arrives through the upper zone of the particle bed and the shell 201a into the chamber 215. The mixture of warm air and water vapor supplied through the conduit 221 is sucked in the upper region of the particle bed 265, through this bed and through the perforated shell 201a into the chamber 215. When the particles are located within the partial zone 261a adjacent to the chamber 213, i.e. in the lower part of the particle bed 265, they will be cooled by the cold air below the dew point temperature of the mixture of warm air and water vapor supplied by the device 239. Both the cold air and the mixture of warm air and water vapor flow through the upper part of the particle bed located before the mouth of the chamber 215, so that the particles do not get cooled there, or only slightly; instead, at least part of the water vapor present on the surface of the particles will condense and wet the same. The temperatures of the cold and warm air, as well as the water vapor content of the cold and warm air may be predetermined in a manner similar to the one described in conjunction with the apparatus shown in FIG. 1. For the rest, the walls of the container 201 and/or those of the housing 203, or at least those of their regions coming in intense contact with moist warm air may conceivably be heated approximately to the temperatures of the warm air, so as to possibly avoid any condensation of water vapor in the said walls. As soon as the particles 263 have been sufficiently wetted, and in particular in the course of a drying process which follows the application of a coating on the particles—in analogy to the case of the apparatus shown in FIGS. 1 and 2—the device 239 will evidently be put out of operation and cooled or heated air will perhaps be applied through the conduits 217 and 221.

Figure 4:
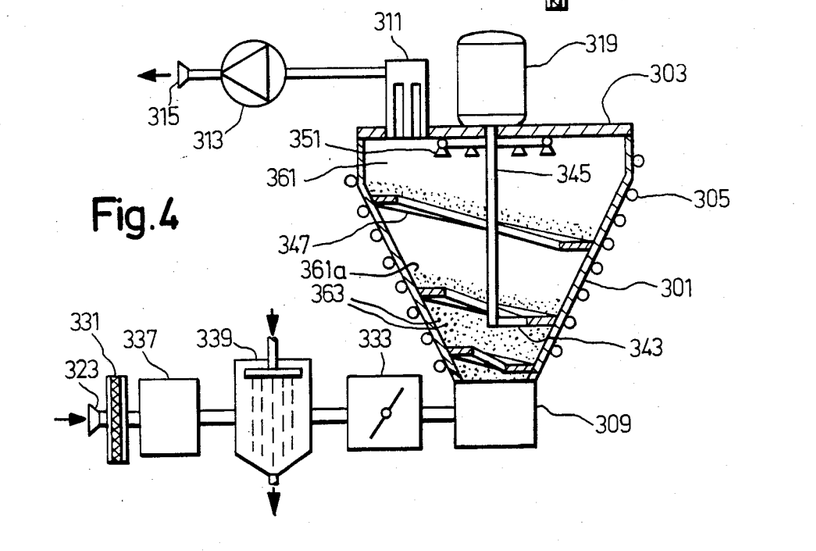
FIG. 4 shows in schematic form a vertical section through an apparatus comprising a container and a mechanical device for imparting motion, to move the particulate material.

The apparatus shown in FIG. 4 comprises a container 301 fixedly mounted in a frame not shown in the drawing and comprising a main section conically tapered in downward direction, the wall of said container generally displaying rotational symmetry with respect to a vertical axis. The container 301 is closed at its upper end by means of a cover plate 303 and provided at its lower end with a gas inlet and a gas distributor 309. This gas distributor also includes means for removing the particles, not shown in detail in the drawing; a means of this kind could be for example a passage to be opened or closed, as desired, by means of a locking member. At least one part of the wall of the container 301 is provided with a cooling device 305, such as a cooling coil. A movable member 343, specifically rotatable around the vertical axis of rotational symmetry, includes a vertical shaft 345, on which is fastened a conveying member 347 consisting of a helical band, by means of fastening elements, such as thin radial rods. The conveying member 347 has an approximately rectangular cross-section for example, and abuts at its outer edge against the conical part of the container wall. The radial width of the conveying member 347 measured to the shaft 345 is, at least in the upper part of the container 301, considerably smaller than the inside radius of the container 301; an opening thus results inside the conveying member, i.e. in the zone near its axis. The shaft 345 is connected through a sealed opening of the cover plate 303 with a driving device 319 and is rotatably supported in the latter and/or the cover plate. Mounted on the cover plate 303 is also a filter 311, which pneumatically connects the space 361 bounded by the container 301 and imperviously closed with respect to the surroundings, i.e. the inner space of the container 301, with the inlet of a suction device 313, the exit of which is connected with the air outlet 315. An air inlet 323 is connected with the gas inlet and distributor 309 through a filter 331, a heating device 337, a device 339 for generating the mixture of gas and water vapor, and a valve 333.

The container 301 also comprises at least one spraying member 351, which may be for example fixedly mounted on the cover plate 303; the shaft 345 too, may be adapted to function as a spraying member, in addition to or instead of the aforementioned spraying member 351, or else the shaft may be provided with such a member.

The apparatus shown in FIG. 4 may be used for the agglomeration and/or the coating of particles 363. Such particles may be introduced into the space 361 in batches by way of a lockable feed opening provided in the cover plate but not shown in the drawing. During operation the member 343 is rotated in a way to have its conveying member 347 convey the particles 363 along the wall of the container in upward direction; then, inside the conveying member the particles fall back again to the bottom, by virtue of the force of gravity. At the same time a mixture of warm air and water vapor is sucked by the suction device 313 through the particles 363 from below to above. At least one part of the container wall, with which the particles come in contact during their movement imparted by the helical member 347 is cooled by the cooling device 305 to a temperature which lies below the dew point temperature of the mixture of warm air and water vapor supplied by the device 339. Accordingly, these particles, which are momentarily located within the partial zone 361a of the space 361 adjoining the wall of the container 301 and are conveyed therein in upward direction, are cooled down to the aforementioned dew point temperature, so that water vapor condenses on these particles. Water vapor may condense at the same time on the inner surface of the cooled part of the container wall, the water film thus formed being continuously transferred onto the particles moved along the wall. Instead of, or in addition to the cooling device 305 the conveying member 347 could be equipped on its top surface with its own cooling device for cooling the particles which it momentarily engages. Furthermore, it would be possible to make provisions to introduce cold air during certain intervals into the space 301, instead of the mixture of warm air and water vapor, in order to cool the particles 363. The spraying member 351 may be used for spraying the particles with a material, if the process requires it. Evidently, when using the apparatus of FIG. 4 the supplied air must not be moistened during the drying phase following the agglomeration or coating.

If in the apparatus shown in FIGS. 1 and 2 air is sucked off the top of the container 1 or 101 for the purpose of generating a whirling layer, the pressure in the spaces 61 or 161 containing the particulate material will drop to a value below that of the surrounding pressure, the pressure difference being, however, relatively small. A blower could be provided, if needed, and be connected for example upstream of the filter 31, for blowing air into the container 1 or 101, as the case may be. The apparatus shown in FIG. 3 may be operated in a way to have the pressure prevailing in the space 261 bounded by the rotatable cylinder to be about equal to the pressure prevailing in the surroundings of the apparatus; the pressure may be set, of course, to a pressure value somewhat lower or higher. When operating the apparatus shown in FIG. 4, the suction device 313 makes the pressure in the space 361 of the container 301 fall below the pressure of the surrounding atmosphere.

The pressure prevailing in the space 361 may be set to within certain limits of a desired value by means of the valve 333; this pressure may be reduced, if required, to a relatively low value, for example, as low as $5 \cdot 10^4$ Pascal or even $10^4$ Pascal. However, in the apparatus of FIG. 4 a blower could be provided in addition to the suction device 313, to blow air into the container from underneath.

In the apparatus shown in FIG. 2 the hollow cylindrical flow guide element 117 could be replaced by a flow guide element of a different shape, such as the shape of a conical sleeve.

In the apparatus shown in FIG. 3 certain ones of the pneumatic connections could be interchanged. Thus for example the chamber 215 could be connected with the device 239, and one of the openings 201c could be connected with the filter 241. It would also be possible to supply during the operation cold air and a mixture of warm air and water vapor alternately, by way of the chamber 213 and/or the conduit 221.

In the devices destined to generate a mixture consisting of a gas and water vapor as wetting means, it may be possible to provide a different device instead of the sprinkler-like liquid distributor to make the vaporization of the liquid wetting agent possible or to promote such vaporization. If the batches of the particulate material to be processed are relatively small and if the apparatus is located in surroundings containing warm and moist air, then the devices 37, 39, 137, 139, 237, 239, 337, 339 for heating and moistening the air may be dispensed with altogether, and surrounding air may be introduced into the spaces 61, 161, 261, 361, respectively, in lieu of the mixture of warm air and water vapor. It may be possible furthermore to insert drying devices in front of the cooling devices 35, 235, for drying the gases passed through them.

The embodiments shown in FIGS. 1 to 4 and their methods of operation may be modified to the effect, that instead of air another gas, such as an inert gas, for example nitrogen, is cooled, heated, and/or moistened, as required, and conveyed through the particulate material introduced in batches into the respective containers.

In all of the aforedescribed embodiments of the process of the invention, a different vaporized wetting agent could be admixed to the warm air supplied to the particulate material instead of the water vapor or in addition to it; this other wetting agent would then condense upon contact with the particles cooled below its dew point temperature. An organic solvent, such as alcohol or isopropanol could be considered for example for a wetting agent of this kind. Even if another wetting agent is used instead of water, it is of advantage to cool the particles in the cooling phase to a temperature at which the wetting agent does not yet freeze on the particles. For practical reasons this temperature should lie by less than 20° C., preferably by less than 10° C., for example by 5° C. above the freezing temperature of the wetting agent, or perhaps even slightly below this temperature.

In all of the types of containers shown in FIGS. 1 to 4, it may also be possible, to convey the gas passed through the particulate material within a cycle; this holds true in the apparatus of FIG. 1 for one part of the air at least, depending on the setting of the valve 21. A closed gas cycle may be of advantage if a gas different from air is passed through the particulate material and/or if instead of water vapor a different vaporized wetting agent is admixed to the gas. Furthermore, it may be possible to equip all of the embodiments shown in FIGS. 1 to 4 with devices adapted to effect recovery of energy and/or of wetting agent from the gas that has passed through the particulate material.

The wetting agent vapor destined to be condensed on the outer surface of the particles may conceivably be admixed to the gas only in the space in which the particulate material is located. In this case, the temperature of the wetting agent vapor in said space should not lie above the limit temperature allowable for the particulate material. It is also possible to have the wetting agent vapor generated only in the space containing the particulate material. To this end, the said spraying member could be adapted to spray a material containing a liquid wetting agent which, when introduced into said space would at least partially vaporize of volatilize and then again condense on the cooled particles.

The apparatuses shown in the FIGS. 1 to 4 may be used for wetting materials that are in following processes dried again as already mentioned. These following drying processes that may take place in the same containers as the wetting can be performed according to one of the manners described in my co-pending application, U.S. patent application Ser. No. 735,264 filed at the same date as this application and having the priority of the Swiss application 2484/84 of May 19, 1984. The apparatuses disclosed in the two applications may then accordingly be combined in a manner allowing a wetting and following drying in the same container.

Previously, specific embodiments of the present invention have been described. It should be appreciated, however, that these embodiments have been described for the purpose of illustration only, without any intention of limiting the scope of the present invention. Rather it is the intention that the present invention be limited only by the appended claims.

What is claimed is:

1. A process of treating a particulate material, in which the particles are subjected to motion, in a space, gas is passed through the particles and the vapor of a wetting agent destined to wet the particles is added to the gas at least during a certain time interval, so that at least one zone of the space containing the particles will contain a mixture of gas and wetting agent vapor, wherein the particles are cooled below the dew point temperature which the mixture of gas and wetting agent vapor has at least at the time before its contact with the particles and before it wets the particles by condensing wetting agent vapor, in which the space containing the particles is closed off from the surroundings, wherein the wetting agent vapor is intermixed with the gas before the gas is introduced into said space, the wetting agent being at the most incompletely saturated at the time the mixture of gas and wetting agent enters said space, and wherein a colder gas destined to cool the particles is passed through at least one zone of the said space, the temperature of said colder gas being lower than the temperature of the mixture of gas and wetting agent vapor and than said dew point temperature.

2. A process according to claim 1, wherein the wetting agent comprises at least one of water and an organic solvent and is in the liquid state at room temperature, and wherein the particles are subsequently dried to remove at least a part of the wetting agent.

3. A process according to claim 2, wherein the particles are predominantly cooled only under the condition, that said space is supplied at the most with wetting agent that is less than is supplied for the generation of the mixture of gas and wetting agent vapor.

4. A process according to claim 2, wherein some material is deposited onto particles that were originally provided in the particulate material, and wherein particles originally provided in the particulate material are deposited onto other particles originally provided in the particulate material, so that agglomerate particles are formed.

5. A process according to claim 2, wherein the particles are predominantly cooled only during their dwell within a partial zone of the said space through which they are passed during their motion.

6. A process according to claim 5, wherein the particles are cooled during several time intervals separated by other time intervals, during which other time intervals the particles are cooled at most only slightly.

7. A process according to claim 2, wherein some material is deposited onto particles that were originally provided in the particulate material, and wherein a liquid is sprayed into said space, to form a coating on the particles, said coating consisting of a material different from the material of the particles originally provided in the particulate material, and wherein said coating comprises an organic material.

8. A process as claimed in claim 2, wherein the mixture of gas and wetting agent vapor has during said time interval, in which the particles are wetted, a temperature not higher than 60° C.

9. A process as claimed in claim 2, wherein the mixture of gas and wetting agent vapor has during said time interval, in which the particles are wetted, a temperature not higher than 40° C.

10. A process as claimed in claim 2, wherein the product produced by means of the wetting serves as a drug.

11. A process as claimed in claim 2, wherein the product produced by means of the wetting comprises at least one organic material.

12. A process according to claim 1, wherein said space is bounded by a wall at least partially heated and brought to a temperature, which is higher than said dew point temperature and at most equal to the temperature which the mixture of gas and wetting agent vapor has at its entry into said space.

13. A process according to claim 12, wherein said wall is brought to a temperature substantially equal to the temperature which the mixture of gas wetting agent vapor has at its entry into the said space.

14. A process according to claim 1, wherein the mixture of gas and wetting agent vapor is passed through the entire range of heights of said space occupied by the particles in the course of their motion, the mixture of gas and wetting agent vapor being moved through said range of heights from the bottom to the top and the particles being subjected to whirling in the said range of heights, so as to form a whirling layer.

15. A process according to claim 1, wherein the mixture of gas and wetting agent vapor is passed through the entire range of heights of said space occupied by the particles in the course of their motion, the particles being displaced from the bottom to the top by means of a driving member engaging the same.

16. A process according to claim 1, wherein the gas intermixed with wetting agent vapor and the colder gas are introduced into said space alternately.

17. A process according to claim 1, wherein the gas intermixed with the wetting agent vapor, and the colder gas, are introduced into said space at locations separate from each other.

18. A process according to claim 17, wherein the currents of the two gases in said space are at least partially separated from each other by means of a sleeve-shaped flow guide member.

19. A process according to claim 1, wherein said particulate material is introduced into a container comprising a wall perforated at least partially and the container is rotated around a rotational axis disposed at an angle with respect to the vertical, both the mixture of gas and wetting agent vapor and the colder gas being passed through at least one part of the bed formed in the container by the particles and the perforated wall.

20. A process according to claim 19, wherein a mixture of gas and wetting agent vapor is introduced into the container in a location of the container not covered by the particle bed, while at the same time colder gas is introduced into the particle bed through a zone of the perforated wall covered by the particle bed, gas and wetting agent vapor being removed from the container through a different zone of the perforated wall covered by the particle bed.

21. A process according to claim 1, wherein during the cooling process the particles are cooled down to a temperature lower by at least 10° C. than the temperature of the mixture of gas and wetting agent vapor.

22. A process according to claim 1, wherein some material is deposited onto particles that were originally provided in the particulate material.

23. A process according to claim 1, wherein the wetting agent is water and is in the liquid state at room temperature, and wherein the particles are subsequently dried to remove at least a part of the water.

24. A process of treating a particulate material, in which the particles are subjected to motion, in a space, gas is passed through the particles and the vapor of a wetting agent destined to wet the particles is added to the gas at least during a certain time interval, so that at least one zone of the space containing the particles will contain a mixture of gas and wetting agent vapor, wherein the particles are cooled below the dew point temperature which the mixture of gas and wetting agent vapor has at least at the time before its contact with the particles and before it wets the particles by condensing wetting agents vapor, and wherein the temperature to which the particles are cooled lies above the solidification temperature of the wetting agent so that the latter is deposited by condensing in the liquid state on the particles, and wherein the wetting agent comprises at least one of water and an organic solvent and is in the liquid state at room temperature, and wherein the particles are subsequently dried to remove at least a part of the wetting agent, wherein at least one surface which the particles can come in contact with during their motion is cooled below said dew point temperature, whereby the cooling of said particles is accomplished, and wherein said surface is constituted by a conical wall of a container bounding said space, the particles being made to move along said wall by means of a conveying member rotated around the axis of said conical wall.

* * * * *